United States Patent
Maysel et al.

(10) Patent No.: US 8,964,883 B2
(45) Date of Patent: *Feb. 24, 2015

(54) DISTRIBUTING CLOCK ASSOCIATED WITH A WIRED DATA CONNECTION OVER WIRELESS INTERFACES USING FREQUENCY CORRECTION AT THE TRANSMITTER SIDE

(71) Applicant: Siklu Communication Ltd., Petach-Tikva (IL)

(72) Inventors: Boris Maysel, Rehovot (IL); Yigal Leiba, Holon (IL)

(73) Assignee: Siklu Communication Ltd., Petach-Tikva (IL)

(*) Notice: Subject to any disclaimer, the term of this patent is extended or adjusted under 35 U.S.C. 154(b) by 0 days.

This patent is subject to a terminal disclaimer.

(21) Appl. No.: 13/726,564

(22) Filed: Dec. 25, 2012

(65) Prior Publication Data
US 2013/0121436 A1    May 16, 2013

Related U.S. Application Data

(63) Continuation of application No. 12/873,125, filed on Aug. 31, 2010, now Pat. No. 8,396,178.

(51) Int. Cl.
*H04L 27/00* (2006.01)
*H04L 7/00* (2006.01)
*H04J 3/06* (2006.01)
*H04L 27/26* (2006.01)

(52) U.S. Cl.
CPC .............. *H04L 7/0091* (2013.01); *H04J 3/0658* (2013.01); *H04L 27/2627* (2013.01); *H04L 27/2649* (2013.01)

USPC .......................................... 375/295; 375/316

(58) Field of Classification Search
USPC .......... 375/354, 130, 326, 270, 295; 370/517, 370/328, 509, 423, 241; 331/2
See application file for complete search history.

(56) References Cited

U.S. PATENT DOCUMENTS

| | | |
|---|---|---|
| 5,511,124 A | 4/1996 | Bergner |
| 6,351,500 B2 | 2/2002 | Kumar |
| 6,553,506 B1 | 4/2003 | Hijikata et al. |
| 6,847,675 B2 | 1/2005 | Fullerton et al. |
| 6,850,577 B2 | 2/2005 | Li |
| 7,003,796 B1 | 2/2006 | Humpleman |
| 7,408,898 B1 | 8/2008 | Brown |
| 7,667,572 B2 | 2/2010 | Husak et al. |
| 7,751,418 B2 | 7/2010 | Russell et al. |
| 7,912,164 B2 | 3/2011 | Armstrong et al. |
| 7,920,599 B1 | 4/2011 | Subramanian |
| 2002/0080825 A1 | 6/2002 | Wolf et al. |
| 2003/0123389 A1 | 7/2003 | Russell et al. |
| 2008/0151761 A1 | 6/2008 | Theisen et al. |
| 2008/0265998 A1* | 10/2008 | Wood ............................. 331/2 |

* cited by examiner

*Primary Examiner* — Daniel Washburn
*Assistant Examiner* — Fitwi Hailegiorgis

(57) ABSTRACT

A clock extractor extracts clock frequency f2, from a wired data connection feeding the transmitter with data clocked at the clock frequency f2. A clock error estimator estimates clock frequency error between the clock frequency f2 and a clock frequency f1 derived from a local clock of the transmitter. Clock adder adds the clock frequency error to the clock frequency f1, resulting in a synthesized clock frequency f2. A modulator uses the synthesized clock frequency f2, to modulate a data stream into a modulated signal.

18 Claims, 16 Drawing Sheets

US 8,964,883 B2

DISTRIBUTING CLOCK ASSOCIATED WITH A WIRED DATA CONNECTION OVER WIRELESS INTERFACES USING FREQUENCY CORRECTION AT THE TRANSMITTER SIDE

CROSS-REFERENCE TO RELATED APPLICATIONS

This application is a continuation of U.S. application Ser. No. 12/873,125, filed Aug. 31, 2010.

TECHNICAL FIELD

Some of the disclosed embodiments relate to clock synchronization, and more specifically to distributing clock associated with a wired data connection over wireless interfaces using frequency correction at the transmitter side.

BACKGROUND

Oscillators operative to generate clock signals are inherently inaccurate due to manufacturing limitations and sensitivity to temperature variations. Oscillators inaccuracy is typically measured in parts per million (PPM). An oscillator's accuracy measures the possible range of error between the frequency generated by the oscillator and the manufacturer listed frequency, typically expressed in PPM. According to one example, an oscillator has a manufacturer listed frequency of 1 MHz and an accuracy of 10 PPM. The actual frequency generated by the oscillator may range from 999,990 Hz to 1,000,010 Hz. According to another example, an oscillator produces a clock frequency of 1,000,005 Hz at 10 degrees Celsius and 1,000,010 at 20 degrees Celsius. For this and other reasons, two oscillators located in a transmitter and a receiver of a communication system are unlikely to generate the same frequency even if their manufacturer listed frequencies are identical.

Two methods deployed for clock distribution in packet networks are synchronous-Ethernet (ITU-T G.8262) and IEEE 1588V.2. The synchronous-Ethernet method can distribute clock frequency information through locking of the Ethernet clock, but cannot distribute phase and TOD information. The IEEE 1588V.2 can distribute any type of clock information, but is much more sensitive to issues such as packet delay variation, packet loss and network behavior.

SUMMARY

In one embodiment, a transmitter synthesizes a clock frequency to generate a modulated signal. A clock extractor extracts clock frequency f2, from a wired data connection feeding the transmitter with data clocked at the clock frequency f2. A clock error estimator estimates clock frequency error between the clock frequency f2 and a clock frequency f1 derived from a local clock of the transmitter. Clock adder adds the clock frequency error to the clock frequency f1, resulting in a synthesized clock frequency f2. A modulator uses the synthesized clock frequency f2, to modulate a data stream into a modulated signal.

Optionally, the clock adder adds the clock frequency error to the clock frequency f1 is done using Direct Digital Synthesis (DDS). Optionally, the clock adder is a discrete component in the transmitter. Optionally, the clock adder adds the clock frequency error to the clock frequency f1 numerically, and is part of a processor. Optionally, the processor is the same processor used to modulate the data. Optionally, adding the clock frequency error to the clock frequency f1 is done using Direct Digital Synthesis (DDS).

Optionally, the modulated signal is OFDM, and the synthesized clock frequency f2 is used to modulate the data, by using OFDM data symbols of duration associated with the synthesized clock frequency f2 for creating the modulated signal. Optionally, the modulated signal is OFDM, and the synthesized clock frequency f2 is used to modulate the data includes clocking an Inverse Fast Fourier Transform (IFFT) using a clock associated with the synthesized clock frequency f2.

Optionally, the clock error estimator estimates the clock frequency error between the clock frequency f2 and the clock frequency f1 by counting clock cycles of the clock frequency f2 and the clock frequency f1 over a period, and comparing the counts.

In one embodiment, the transmitter up-converts the modulated signal into a wireless signal containing the synthesized clock frequency f2. A receiver down-converts the wireless signal, into a down-converted wireless signal. A de-modulator de-modulates the down-converted wireless signal into a received data stream thereby reconstructing the synthesized clock frequency f2 into a reconstructed synthesized clock frequency f2, as a direct result of de-modulating the down-converted wireless signal into a received data stream. The receiver feeds a second wired data connection with the received data stream, and clocks the second wired data connection using the reconstructed synthesized clock frequency f2. Optionally, the second wired data connection is an Ethernet wired connection. Optionally, the de-modulator reconstructs the synthesized clock frequency f2 is done in the by locking into symbol timing of the down-converted wireless signal during de-modulation. Optionally, the wired data connection feeding the transmitter is an Ethernet wired connection.

In one embodiment, a transmitter synthesizes a clock frequency to generate a modulated signal. A clock extractor extracts clock frequency f2, from a wired data connection feeding the transmitter with data clocked at the clock frequency f2. A clock error estimator estimates clock frequency error between the clock frequency f2 and a clock frequency f1 derived from a local clock of the transmitter. A clock adder adds the clock frequency error to the clock frequency f1, resulting in a synthesized clock frequency f2. A modulator modulates a data stream into a modulated signal. A transmitter radio up-converts the modulated signal into a wireless signal, using the synthesized clock frequency f2.

Optionally, the clock adder adds the clock frequency error to the clock frequency f1 using Direct Digital Synthesis (DDS). Optionally, the clock adder is a discrete DDS component in the transmitter. Optionally, the clock adders add the clock frequency error to the clock frequency f1 numerically and is part of a processor.

Optionally, the transmitter radio uses the synthesized clock frequency f2 to up-convert the modulated signal, by using the synthesized clock frequency f2 to create a carrier frequency fed into a mixer used for the up-conversion. Optionally, clock error estimator estimates the clock frequency error between the clock frequency f2 and the clock frequency f1 by counting clock cycles of the clock frequency f2 and the clock frequency f1 over a period, and comparing the counts.

In one embodiment, a radio of a receiver reconstructs the synthesized clock frequency f2 into a reconstructed synthesized clock frequency f2, from the wireless signal. The receiver clocks a second wired data connection, using the reconstructed synthesized clock frequency f2. Optionally, the extraction is done using a Phase Lock Loop (PLL). Optionally, the extraction is done using a narrow filter. Optionally, the second wired data connection is an Ethernet wired connection. Optionally, the wired data connection feeding the transmitter is an Ethernet wired connection.

In one embodiment, a transmitter synthesizes a clock frequency to generate a modulated signal an up-convert it to a wireless signal. A clock extractor extracts clock frequency f2, from a wired data connection feeding the transmitter with data clocked at the clock frequency f2. A clock error estimator estimates clock frequency error between the clock frequency f2 and a clock frequency f1 derived from a local clock of the transmitter. A clock adder adds the clock frequency error to the clock frequency f1, resulting in a synthesized clock frequency f2. A modulator uses the synthesized clock frequency f2 to modulate a data stream into a modulated signal containing the synthesized clock frequency f2. A radio up-converts the modulated signal into a wireless signal containing synthesized clock frequency f2, using the synthesized clock frequency f2.

In one embodiment, a receiver down-converts the wireless signal into a down-converted wireless signal. A de-modulator de-modulates the down-converted wireless signal into a received data stream, and as a direct result, reconstructs synthesized clock frequency f2 into reconstructed synthesized clock frequency f2. The receiver feeds a second wired data connection with the reconstructed data, and clocks the second wired data connection using the reconstructed synthesized clock frequency f2.

Optionally, the modulated signal is an Orthogonal Frequency Division Multiplexing (OFDM) signal. Optionally, the de-modulator reconstructs synthesized clock frequency f2 into reconstructed synthesized clock frequency f2 by locking into a pilot component of the OFDM signal conveyed by the down-converted wireless signal. Optionally, the second wired data connection is an Ethernet wired connection. Optionally, the wired data connection feeding the transmitter is an Ethernet wired connection.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

In one embodiment, a wireless link is used to carry data between two or more wired networks. The two or more wired networks, which may be Ethernet-based, often require clock synchronicity. Clock synchronicity is achieved when a two separate wired data connections connected to a single network are clocked at the same frequency. For example, a first wired data connection connected to a transmitter and a second wired data connection are connected to a receiver associated with a wireless link. Both the first wired data connection and the second wired data connection are clocked at the same frequency and have clock synchronicity.

Clock synchronicity may be readily achieved using standards such as Ethernet (ITU-T G.8262) and IEEE 1588V.2. However, these standards cannot be effective when a plain wireless link is used to interconnect the two or more wired networks, mainly because the wireless link uses locally generated clocks, unrelated to the wired network clock. Therefore, to achieve clock synchronicity over a wireless link, the wireless link includes an additional functionality enabling it to facilitate clock synchronicity. In one embodiment, a transmitter associated with a wireless interface extracts a clock form a first wired network. The extracted clock frequency is embedded into the wireless signal. In one embodiment, the clock frequency is synthesized locally and is used to clock the modulation and up-conversion of the data from the first wired network. In one embodiment, information related to the extracted clock frequency is conveyed via the wireless link. The synthesized clock signal or a numeric value expressing its frequency is extracted in the receiver and is used to clock the second wired network. The result is data on the first wired network and data on the second wired network sharing the same clock frequency. Optionally, the transmitter extracts the clock from the first wired network periodically, allowing the system to track changes in clock frequency on the first wired network, for example due to temperature variations.

Figure 1:
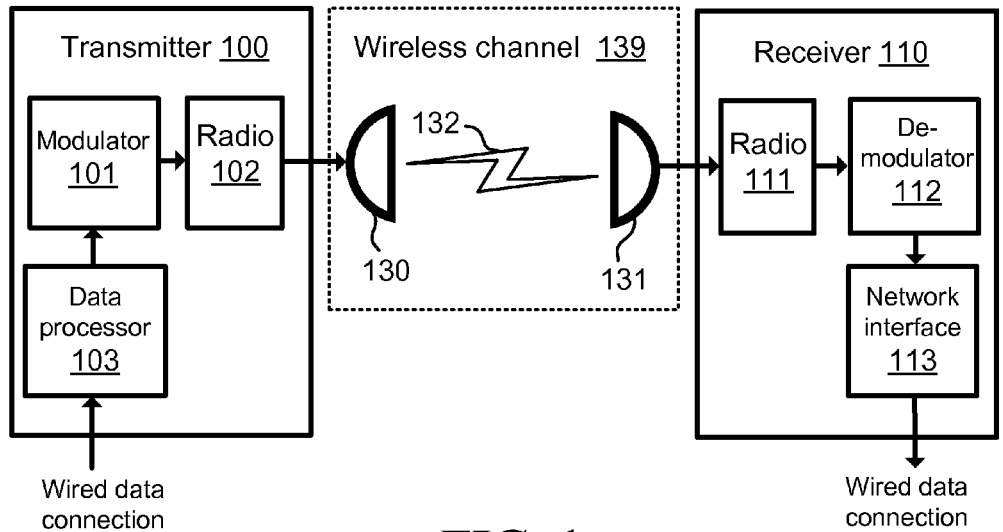
FIG. 1 illustrates one embodiment of a wireless network system including a transmitter and a receiver.

FIG. 1 illustrates one embodiment of a wireless radio system operative to transmit data from a first network to a second network using wireless interface. A transmitter 100 sends the data to a receiver 110 via a wireless channel 139. The transmitter 100 includes a data processor 103, modulator 101, and transmitter radio 102. Data from a first network arrives at the transmitter 100 via a first wired data connection. Data processor 103 converts the data into a data stream, and then sends the data stream to the modulator 101. The modulator 101 converts the data stream into a modulated signal. The transmitter radio 102 up-converts the modulated signal into a wireless signal 132 and sends it via the wireless channel 139. Wireless channel 139 includes a transmitter antenna 130, receiver antenna 131, and a wireless signal 132.

The receiver 110 receives the wireless signal 132 from the wireless channel 139. The receiver 110 includes a receiver radio 111, de-modulator 112, and network interface 113. The receiver radio 111 down-converts the signal from radio frequency into a down-converted wireless signal. The demodulator 112 then extracts a received data stream from the down-converted wireless signal. The network interface 113 then sends the data into the second network via a second wired data connection.

In one embodiment, a transmitter synthesizes a clock frequency to generate a modulated signal. A clock extractor extracts clock frequency f2 from a wired data connection feeding the transmitter with data clocked at the clock frequency f2. A clock estimator estimates clock frequency error between the clock frequency f2 and a clock frequency f1 derived from a local clock of the transmitter. A clock adder adds the clock frequency error to the clock frequency f1, resulting in a synthesized clock frequency f2. A modulator uses the synthesized clock frequency f2 to modulate a data stream into a modulated signal.

In one embodiment, clock frequency f2 has a frequency equal to assumed frequency f2 plus clock inaccuracy f2. Assumed frequency f2 is a static number, which may equal to the manufacturer listed or announced frequency of clock frequency f2. Clock inaccuracy f2 may be a result of manufacturing inaccuracy and temperature variation. Therefore, clock inaccuracy f2 may change over time. Clock frequency f2 may be scaled-up or down, and retain the same clock inaccuracy f2 relative to assumed frequency f2, for example as a percentage or PPM. According to one example, scaling clock frequency f2 up by four times will quadruple the frequency of clock frequency f2, assumed frequency f2 and clock inaccuracy f2. The ratio between clock inaccuracy f2 and assumed frequency f2 will remain the same after scaling. For example, the frequency of clock frequency f2 is 125 MHz+10 PPM. The assumed frequency f2 is 125 MHz and the clock inaccuracy f2 is +10 PPM. Clock frequency f2 may be up-scaled four times, resulting in clock frequency f2 of 500 MHz+10 PPM.

In one embodiment, clock frequency f1 has a frequency equal to assumed frequency f1 plus clock inaccuracy f1. Assumed frequency f1 is static. Clock inaccuracy f1 may be a result of manufacturing inaccuracy and temperature variation. Therefore, clock inaccuracy f1 may change over time. Clock frequency f1 may be scaled-up or down, and retain the same clock inaccuracy f1, relative to assumed frequency f1, for example as a percentage or PPM.

Figure 2A:
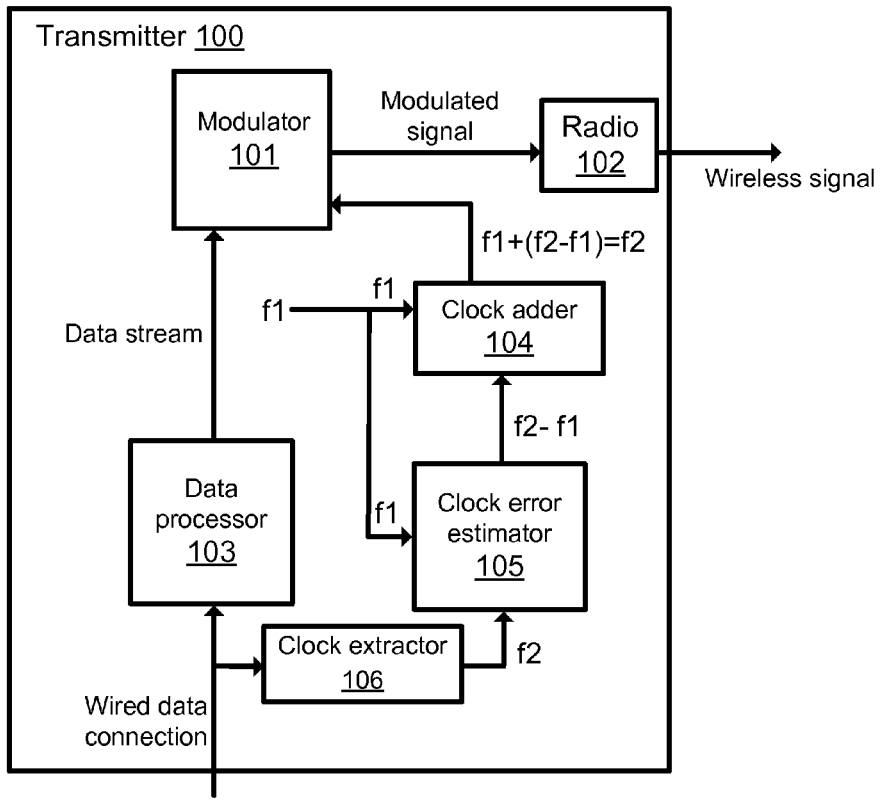
FIG. 2A illustrates one embodiment of a wireless transmitter including a clock extractor, modulator and radio.

FIG. 2A illustrates one embodiment of a transmitter 100, synthesizing a clock frequency to generate a modulated signal. Data clocked at clock frequency f2 arrives at the transmitter 100 via a first wired data connection. Data processor 103 converts the data clocked at the clock frequency f2 to a data stream and sends it to a modulator 101. According to one example, the data processor 103 is a network-enabled processor and its functionality includes deciding which data is sent to the modulator 101 and packetizing the data stream appropriately. Clock extractor 106 extracts clock frequency f2 from the data clocked at the clock frequency f2. A local clock of the transmitter 100 generates clock frequency f1. Clock error estimator 105 estimates the clock frequency error between the clock frequency f2 and clock frequency f1.

In one embodiment, clock error estimator 105 up-scales or down-scales both clock frequency f2 and clock frequency f1 to a common frequency. In one embodiment, the common frequency is the assumed frequency of clock frequency f1. In one embodiment, the common frequency is the assumed frequency of clock frequency f2. According to one example, the frequency of clock frequency f1 is 10 MHz+1 PPM, assumed frequency f1 is 10 MHz, clock inaccuracy f1 is +1 PPM, the frequency of clock frequency f2 is 125 MHz+10 PPM, assumed frequency f2 is 125 MHz and clock inaccuracy f2 is +10 PPM. Clock frequency f1 is up-scaled to 125 MHz resulting in the frequency of clock frequency f1 being 125 MHz+1 PPM.

The clock frequency error is a numeric value. According to one example, the clock error may be represented in PPM or in Hz. Clock adder 104 adds the clock frequency error to the clock frequency f1, resulting in a synthesized clock frequency f2. In one embodiment, clock adder 104 is a frequency synthesizer able to create waveforms from a single fixed frequency reference. Clock adder 104 uses clock frequency f1 as its fixed frequency reference and creates a new synthesized waveform, clock frequency f2. In one embodiment, clock adder 104 is a Direct Digital Synthesizer.

The synthesized clock frequency f2 is used by the modulator 101 to modulate the data stream, resulting in a modulated signal, which is fed into a transmitter radio 102. Modulator 101 may use clock frequency f2, or a derivative of clock frequency f2, to determine the duration of symbols created by Modulator 101. According to one example, modulator 101 is a DSP and is clocked using clock frequency f2. All timing related to the modulation process is derived from clock frequency f2 and is subject to clock inaccuracy f2.

The transmitter radio 102 up-converts the modulated signal into a wireless signal 132 and sends it via the wireless channel 139. Optionally, clock adder 104 adds the clock frequency error to the clock frequency f1 using Direct Digital Synthesis (DDS). Optionally, a Direct Digital Synthesizer includes a frequency reference, a numerically-controlled oscillator, and a frequency control register. The reference frequency provides a stable time base for the system, determines the clock inaccuracy of the DDS and provides the clock to the numerically controlled oscillator. The numerically controlled oscillator output a discrete-time, quantized version of the desired output waveform (optionally a square wave clock signal) whose frequency is equal to the reference frequency plus the number in the frequency control register. Optionally, clock adder 104 is a discrete DDS component in the transmitter.

Optionally, clock adder 104 is implemented numerically by a processor. Optionally, the processor is the same processor used to modulate the data. Optionally, the processor uses Direct Digital Synthesis (DDS) for adding the clock frequency error to the clock frequency f1.

Optionally, the modulated signal is OFDM, and the synthesized clock frequency f2 is used to modulate the data, by using OFDM data symbols of duration associated with the synthesized clock frequency f2 for creating the modulated signal. Optionally, the modulated signal is OFDM, and the synthesized clock frequency f2 is used to modulate the data includes clocking an Inverse Fast Fourier Transform (IFFT) using a clock associated with the synthesized clock frequency f2.

Optionally, clock error estimator 105 estimates the clock frequency error between clock frequency f2 and clock frequency f1 by counting clock cycles of the clock frequency f2 and clock frequency f1 over a period, and comparing the counts.

Figure 2B:
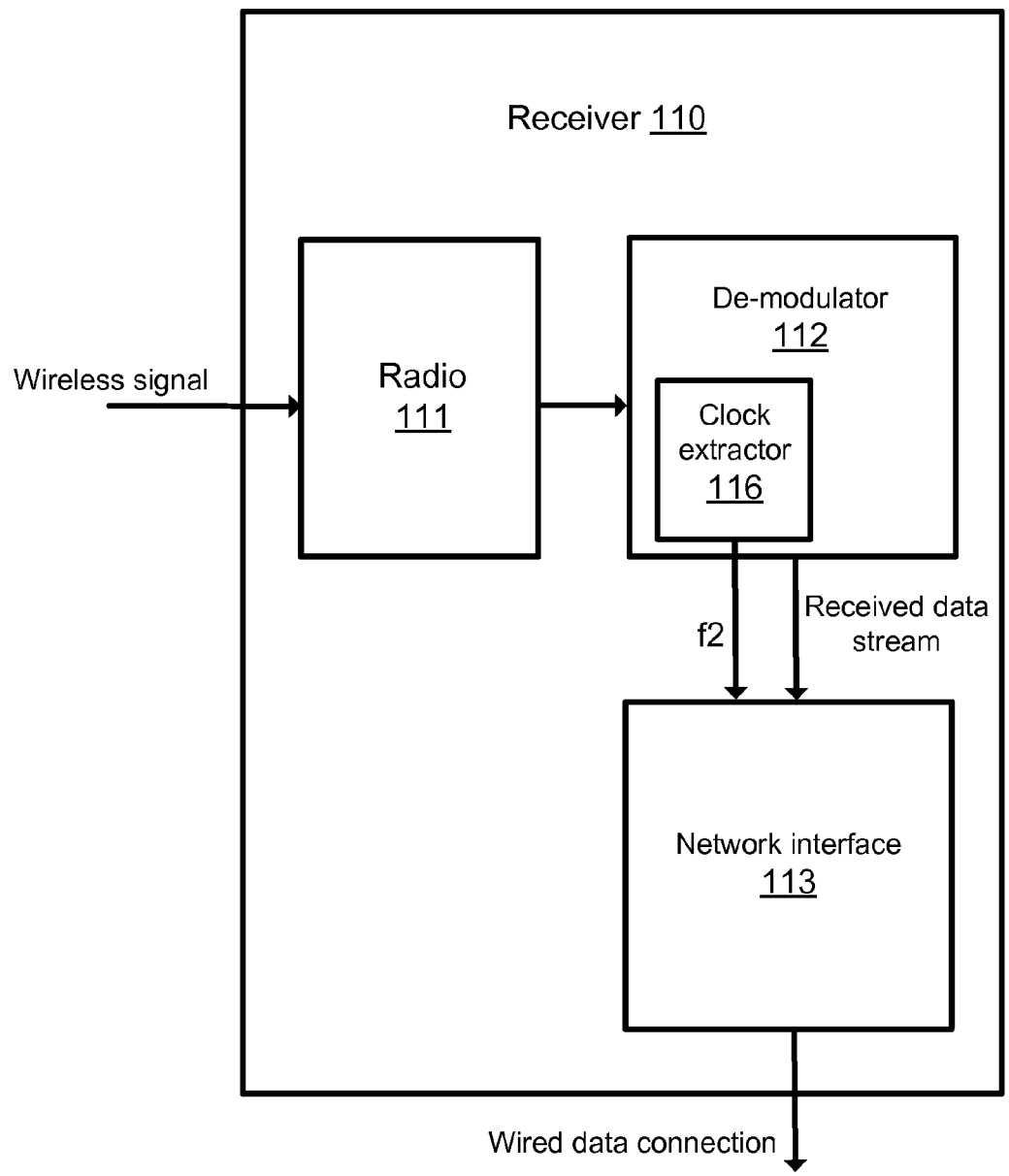
FIG. 2B illustrates one embodiment of a wireless receiver including a radio and de-modulator.

FIG. 2B illustrates one embodiment of a receiver 110 extracting a synthesized clock frequency from a modulated signal and using it to clock a wired network connection. The wireless signal 132 arrives at the receiver 110. A receiver radio 111 down-converts the wireless signal 132 into a down-converted wireless signal. A demodulator 112 extracts a received data stream from the down-converted wireless signal, and as a direct result, reconstructs the synthesized clock frequency f2 into a reconstructed synthesized clock frequency f2, using a second clock extractor 116. The received data stream and the reconstructed synthesized clock frequency f2 are fed into a network interface 113. The network interface 113 clocks the second wired network connection using the reconstructed synthesized clock frequency f2. Optionally, the second wired data connection is an Ethernet wired connection. Optionally, de-modulator 112 reconstructs synthesized clock frequency f2 by locking into symbol timing of the down-converted wireless signal 132 during de-modulation. Optionally, the first wired data connection feeding the transmitter 100 is an Ethernet wired connection.

By way of example, and not limitation, a Gigabit Ethernet connection uses a 125 MHz clock accurate to within 10 PPM. The Gigabit Ethernet connection transports data such as files, video conferencing, and network management data, to a transmitter 100. A data processor 103, which may be a network-enabled processor, receives the data from the Gigabit Ethernet connection and prepares it for transport over a wireless network. In one example, data processor 103 may separate information intended for transmission over the wireless link, such as files and video conferencing, from network management information, and repackages the data as a data stream. Clock extractor 106 extracts clock frequency f2 from the data clocked at the clock frequency f2. Clock frequency f2 may be a square wave clock signal of frequency 125 MHz (assumed frequency f2 125 MHz) with a 10 PPM accuracy. In one example, clock frequency f2 has a frequency of 125 MHz+10 PPM. Assumed frequency f2 is 125 MHz and clock inaccuracy f2 is +10 PPM, such that the frequency of clock frequency f2 is 125,001,250 Hz. Clock frequencies vary due to manufacturing accuracy and may change over time due to temperature variations. A clock frequency f1 of 10 MHz (assumed frequency f1 10 MHz) with a 1 PPM accuracy is derived from a local clock of the transmitter. In one example, clock frequency f1 is 10 MHz+1 PPM. Assumed frequency f1 is 10 MHz and clock inaccuracy f1 is +1 PPM, such that clock frequency f1 is 10,000,010 Hz. Clock error estimator 106 estimates the clock frequency error between clock inaccuracy f2 and clock inaccuracy f1. Clock frequency f1 and clock frequency f2 may be scaled to the same assumed frequency. Optionally, clock error estimator 106 is configured to scale clock frequency f1 up to a frequency 12.5 times higher, for example, by scaling clock frequency f1 to a frequency 25 times higher and then scaling clock frequency f1 down to a frequency 2 times lower. The result is a clock frequency f1 of 125 MHz+1 PPM (125,000,125 Hz). Clock inaccuracy f1 remains +1 PPM after the scaling process. Clock error estimator 105 may count the number of clock peaks of both clock frequencies over a period of one second, and subtracts the difference. Since assumed frequency f1 and assumed frequency f2 are made identical through the scaling process, the result of the clock error estimator is a numeric value, associated with the difference between the clock inaccuracies of clock frequency f2 and clock frequency f1 and is illustrated as "f2−f1" in FIG. 2A. According to one example, the value associated with "f2−f1" is 9 PPM when represented in relative terms or 1,125 Hz when represented in Hz (equal to 9 PPM of 125 MHz). Using DDS, a clock adder 104 adds 9 PPM to clock frequency f1 (10 MHz+1 PPM), resulting in a synthesized clock frequency f2 of 10 MHz+10 PPM which is 10,000,100 Hz. Synthesized clock frequency f2 has the same clock inaccuracy as clock frequency f2. In one example, the synthesized clock frequency f2 is used by the modulator 101 to modulate the data stream into a modulated signal. According to one example, modulator 101 uses OFDM modulation. OFDM data symbols, of duration associated with the synthesized clock frequency f2, may be used to create the modulated signal. The modulated signal is fed into radio 102 that up-converts it into a wireless signal.

According to one example, extracting clock frequency f2 is done periodically to track changes in the clock inaccuracy f2 of the wired data connection. Synthesized clock frequency f2 has the same clock inaccuracy of clock frequency f2, when expressed PPM or percentage of the assumed frequency, and can be scaled to have substantially the same frequency as clock frequency f2. Synthesized clock frequency f2 does not suffer from signal integrity problems or signal drops regardless of the fidelity or the quality of signal arriving on the wired data connection.

According to one example, the wireless signal 132 is received by receiver 110. Radio 111 down-converts the wireless signal 132 and feeds it into a de-modulator 112. Demodulator 112 extracts a received data stream from the down-converted wireless signal 132 using OFDM de-modulation. The demodulator 112 reconstructs the synthesized clock frequency f2 into a reconstructed synthesized clock frequency f2 by using a second clock extractor 116. Clock extractor 116 may use the OFDM data symbols duration to determine clock frequency f2. The reconstructed synthesized clock frequency f2 may be up-scaled to assumed frequency of 125 MHz. In this case, the reconstructed synthesized clock frequency f2 has a frequency of 125 MHz+10 PPM. The received data stream and reconstructed synthesized clock frequency f2 are fed into a network interface 113 which re-packetizes the received data stream and clocks it using the reconstructed synthesized clock frequency f2 (125 MHz+10 PPM). Optionally, the second network interface 113 is a second Gigabit Ethernet connection of a second network system. The result is clock synchronicity between the first wired network connected to the transmitter and the second wired network connected to the receiver.

In one embodiment, a transmitter synthesizes a clock frequency to generate a modulated signal. A clock extractor extracts clock frequency f2 from a wired data connection feeding the transmitter with data clocked at the clock frequency f2. A clock error estimator estimates clock frequency error between the clock frequency f2 and a clock frequency f1 derived from a local clock of the transmitter. A clock adder adds the clock frequency error to the clock frequency f1, resulting in a synthesized clock frequency f2. A modulator modulates a data stream into a modulated signal. A transmitter radio up-converts the modulated signal into a wireless signal, using the synthesized clock frequency f2.

Figure 3A:
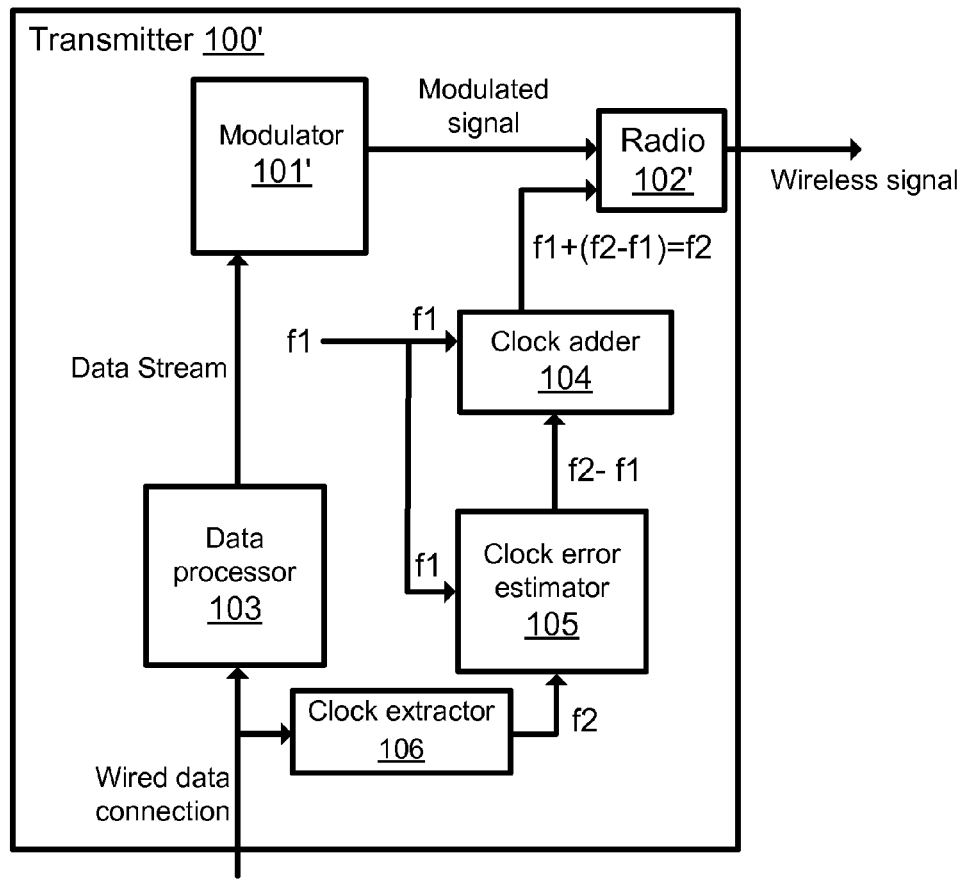
FIG. 3A illustrates one embodiment of a wireless transmitter including a clock extractor, modulator and radio.

FIG. 3A illustrates a transmitter 100' using a synthesized clock frequency to generate a wireless signal. Data clocked at clock frequency f2 arrives at the transmitter 100' via a first wired data connection. Data processor 103 converts data clocked at the clock frequency f2 to a data stream and sends it to a modulator 101'. Clock extractor 106 extracts clock frequency f2 from the data clocked at the clock frequency f2. A local clock of the transmitter 100 creates a clock frequency f1. Clock error estimator 105 estimates the clock frequency error between the clock frequency f2 and clock frequency f1. Clock adder 104 adds the clock frequency error to the clock frequency f1, resulting in a synthesized clock frequency f2. The modulator 101' modulates the data stream resulting in a modulated signal, which is fed into a transmitter radio 102'. The transmitter radio 102' uses synthesized clock frequency f2 to up-convert the modulated signal into a wireless signal. Optionally, radio 102' uses the synthesized clock frequency f2 to create a carrier frequency, which is fed into a mixer used for the up-conversion of the modulated signal.

Figure 3B:
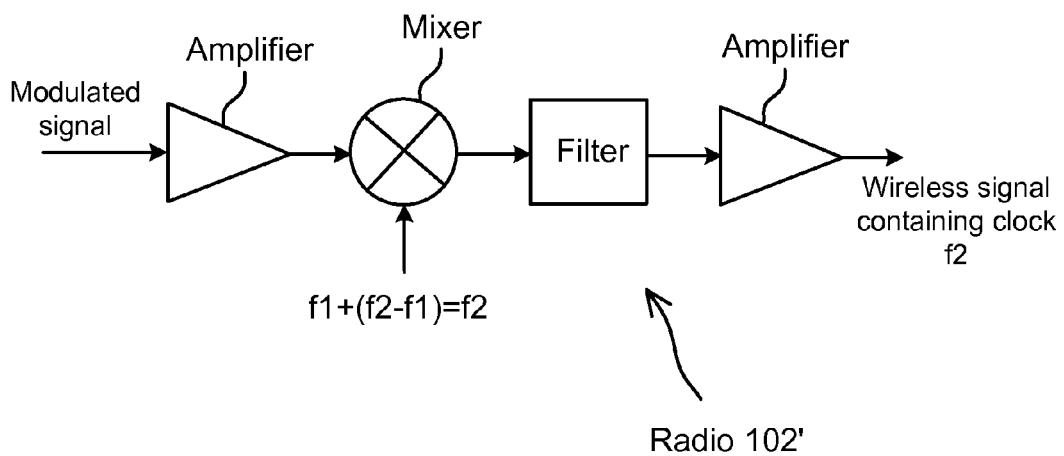
FIG. 3B illustrates one embodiment of a radio including an amplifier and a mixer.

FIG. 3B illustrates one embodiment of a radio 102' using synthesized clock frequency f2. First, the modulated signal may be amplified. A mixer multiplies the amplified modulated signal with a carrier wave, created from the synthesized clock frequency f2. In one example, the synthesized clock frequency f2 is scaled-up to a predetermined radio frequency and retains the same clock inaccuracy. The mixer outputs a signal containing synthesized clock frequency f2. Optionally, additional filtering and amplification may be applied before sending the wireless signal 132 via wireless channel 139.

Figure 3C:
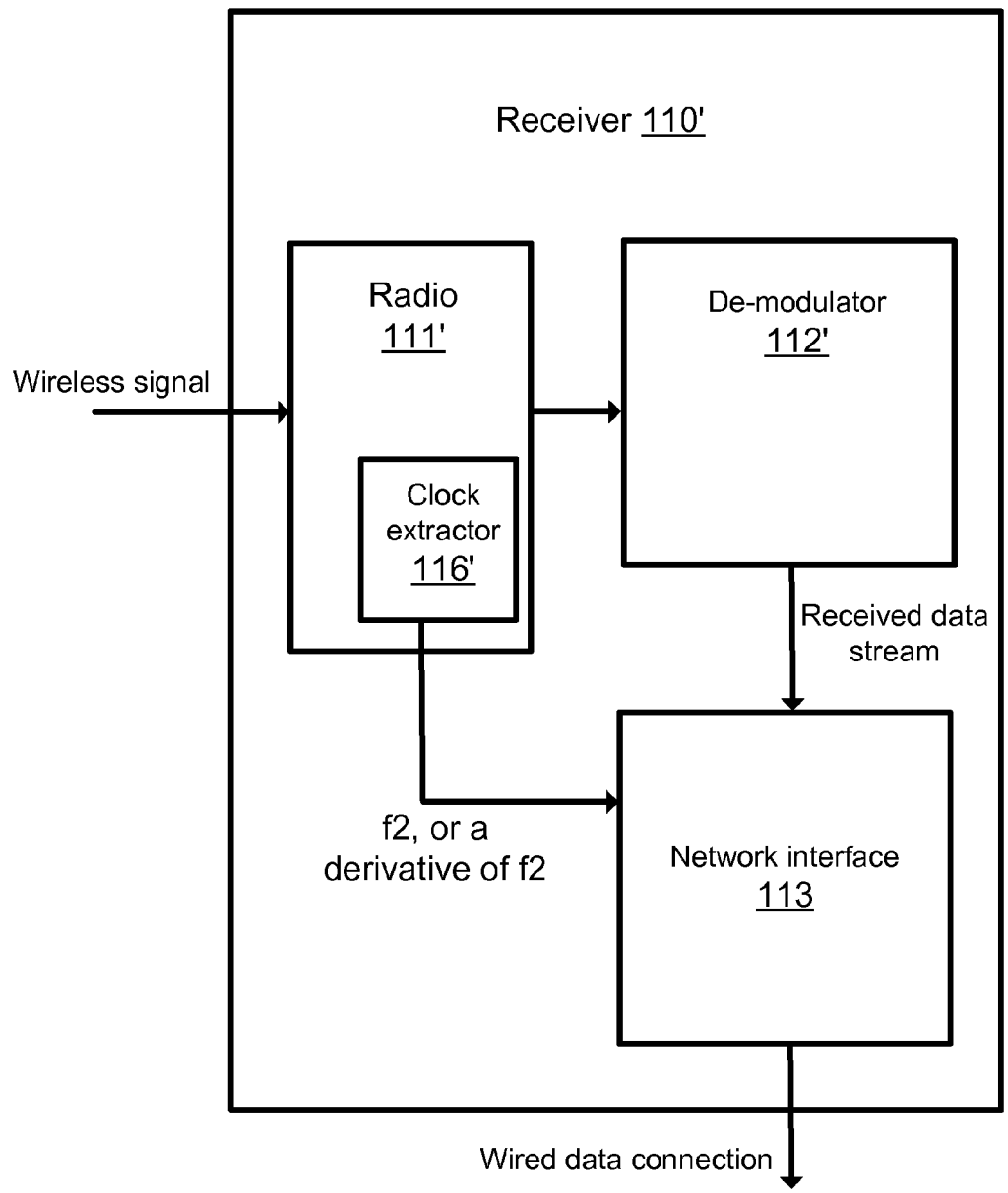
FIG. 3C illustrates one embodiment of a wireless receiver including a radio and de-modulator.

FIG. 3C illustrates one embodiment of a receiver 110' extracting a synthesized clock frequency from a wireless signal 132 and using it to clock a second wired data connection. The wireless signal 132 arrives at the receiver 110'. A receiver radio 111' down-converts the wireless signal 132. The receiver radio 111' includes a clock extractor 116'. Clock extractor 116' extracts a reconstructed synthesized clock frequency f2 from the wireless signal. Receiver radio 111' sends the down-converted wireless signal 132 to a de-modulator 112', and the reconstructed synthesized clock frequency f2 to a network interface 113'. The de-modulator 112' extracts a received data stream from the down-converted wireless signal 132, and sends it to the network interface 113'. The network interface 113' uses the reconstructed synthesized clock frequency f2 to clock the received data stream at clock frequency f2, and then sends it to a second wired data connection. Optionally, clock extractor 116' uses a Phase Lock Loop (PLL). Optionally, clock extractor 116' uses a narrow filter. Optionally, the second wired data connection is an Ethernet wired connection. Optionally, the first wired data connection feeding the transmitter is an Ethernet wired connection.

In one embodiment, a transmitter synthesizes a clock frequency to generate a modulated signal an up-convert it to a wireless signal. A clock extractor extracts clock frequency f2 from a wired data connection feeding the transmitter with data clocked at the clock frequency f2. A clock error estimator estimates clock frequency error between the clock frequency f2 and a clock frequency f1 derived from a local clock of the transmitter. A clock adder adds the clock frequency error to the clock frequency f1, resulting in a synthesized clock frequency f2. A modulator uses the synthesized clock frequency f2 to modulate a data stream into a modulated signal containing the synthesized clock frequency f2. A transmitter radio up-converts the modulated signal into a wireless signal containing synthesized clock frequency f2, using the synthesized clock frequency f2.

Figure 4:
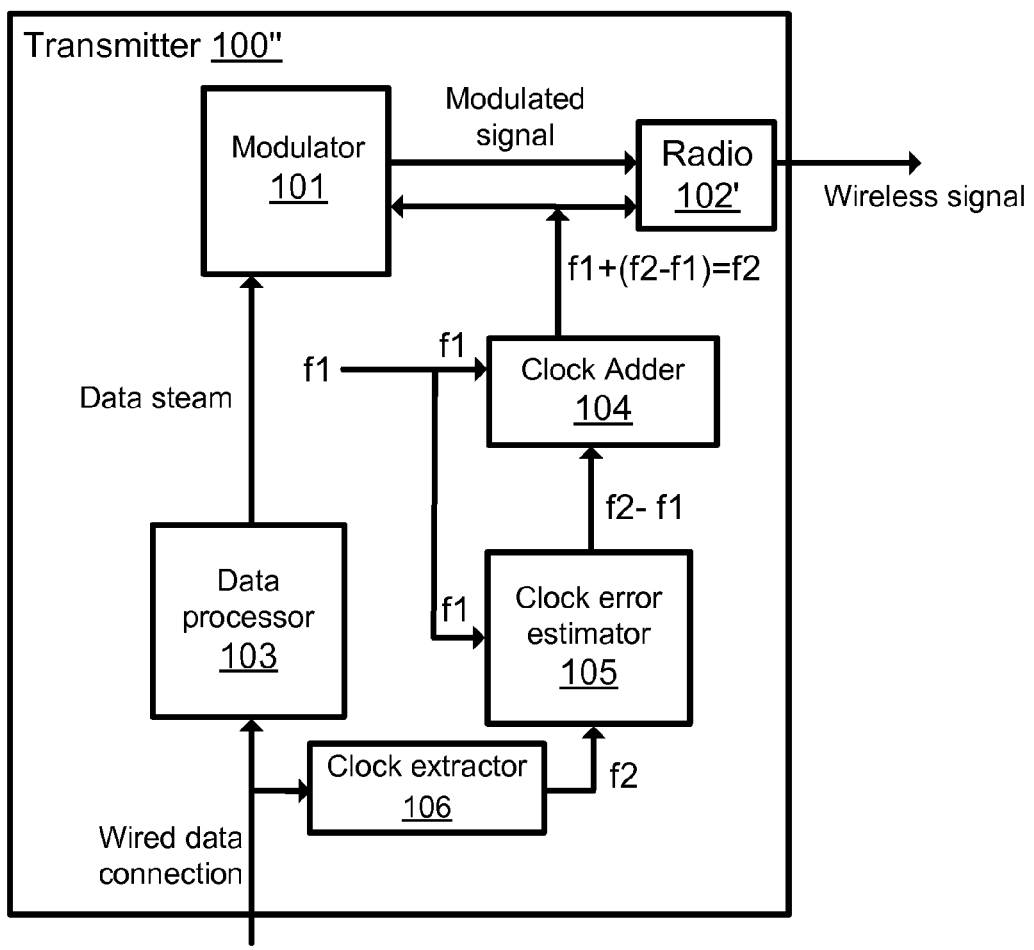
FIG. 4 illustrates one embodiment of a wireless transmitter including a clock extractor, modulator and radio.

FIG. 4 illustrates one embodiment of transmitter 100", synthesizing a clock frequency to generate a modulated signal and up-convert it to a wireless signal. Data clocked at clock frequency f2 arrives at the transmitter 100" via a first wired data connection. Data processor 103 converts data clocked at the clock frequency f2 to a data stream, and sends it to a modulator 101. Clock extractor 106 extracts clock frequency f2 from the data clocked at the clock frequency f2. A local clock of the transmitter 100 creates a clock frequency f1. Clock error estimator 105 estimates the clock frequency error between the clock frequency f2 and clock frequency f1. Clock adder 104 adds the clock frequency error to the clock frequency f1, resulting in a synthesized clock frequency f2. The synthesized clock frequency f2 is used by the modulator 101 to modulate the data stream, resulting in a modulated signal, which is fed into a transmitter radio 102'. The transmitter radio 102' uses the synthesized clock frequency f2 to up-convert the modulated signal into a wireless signal.

Optionally, the synthesized clock frequency f2 is reconstructed by a receiver 110 illustrated in FIG. 2B and used to clock a second wire data connection. Optionally, the synthesized clock frequency f2 is reconstructed by a receiver 110' illustrated in FIG. 2C and used to clock a second wire data connection.

Optionally, the modulated signal is an Orthogonal Frequency Division Multiplexing (OFDM) signal. Optionally, the de-modulator 112 reconstructs the synthesized clock frequency f2 into reconstructed synthesized clock frequency f2 by locking into a pilot component of the OFDM signal conveyed by the down-converted wireless signal. Optionally, the second wired data connection is an Ethernet wired connection. Optionally, the wired data connection feeding the transmitter 100" is an Ethernet wired connection.

Figure 5A:
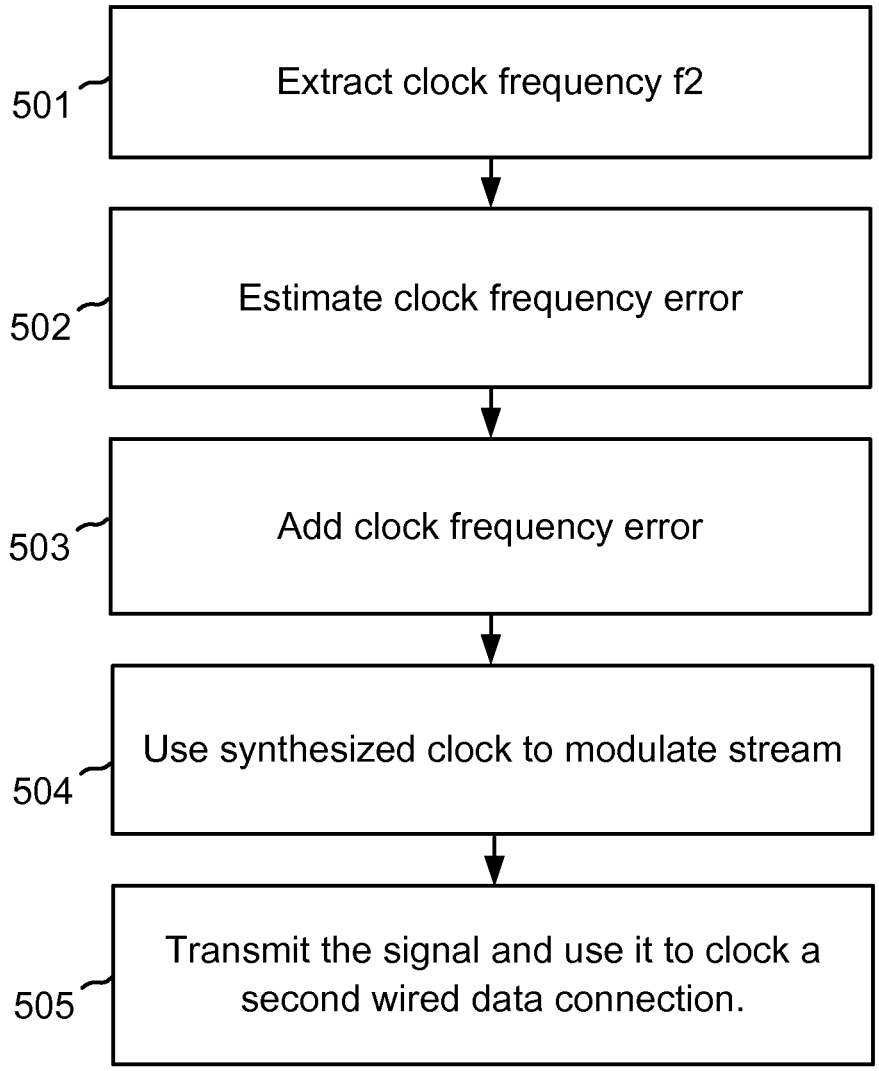
FIG. 5A is an illustration of a flow diagram describing one method for achieving clock synchronicity.

FIG. 5A is a flow diagram illustrating one method of using a synthesized clock frequency to generate a modulated signal, comprising the following steps: In step 501, extracting, clock frequency f2 from a wired data connection feeding a transmitter with data clocked at the clock frequency f2. In step 502, estimating clock frequency error between the clock frequency f2 and a clock frequency f1 derived from a local clock of the transmitter. In step 503, adding the clock frequency error to the clock frequency f1, resulting in a synthesized clock frequency f2. In step 504, using the synthesized clock frequency f2 to modulate a data stream into a modulated signal. In optional step 505, transmitting the signal modulated by synthesized clock frequency f2 and using it to clock a second wired data connection.

Figure 5B:
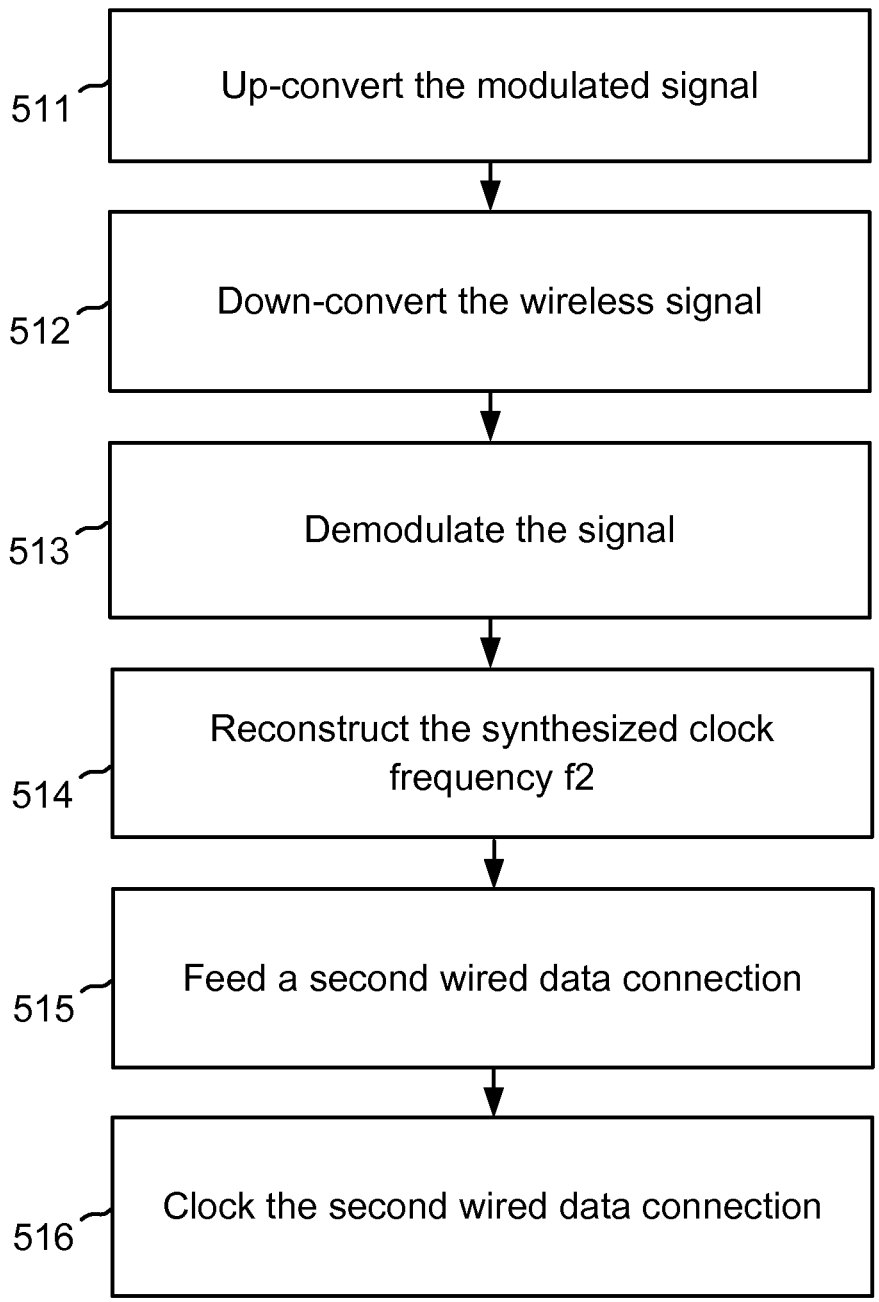
FIG. 5B is an illustration of a flow diagram describing one method for extracting a synthesized clock frequency and using it to clock a wired data connection.

FIG. 5B is a flow diagram illustrating one method of transmitting the signal modulated by synthesized clock frequency f2 and using it to clock a second wired data connection, comprising the following steps: In step 511, up-converting the modulated signal into a wireless signal 132 containing the synthesized clock frequency f2. In step 512, down-converting, by a receiver, the wireless signal 132 into a down-converted wireless signal. In step 513, de-modulating the down-converted wireless signal 132 into a received data stream. In step 514, reconstructing the synthesized clock frequency f2 into a reconstructed synthesized clock frequency f2 as a direct result of de-modulating the down-converted wireless signal 132 into a reconstructed data. In step 515, feeding a second wired data connection, at the receiver, with the reconstructed data. In step 516, clocking the second wired data connection using the reconstructed synthesized clock frequency f2.

Figure 5C:
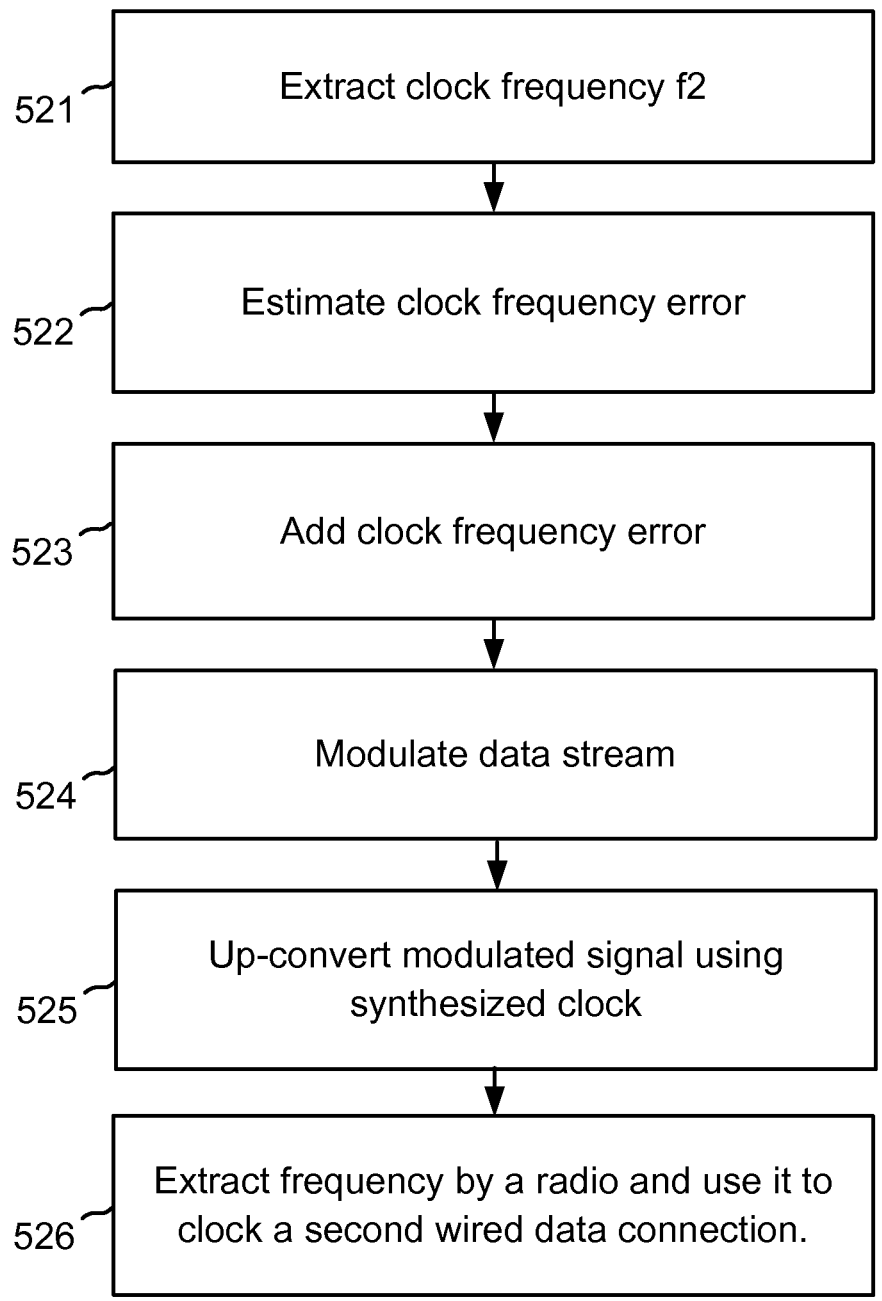
FIG. 5C is an illustration of a flow diagram describing one method for achieving clock synchronicity.

FIG. 5C is a flow diagram illustrating one method of using a synthesized clock frequency to generate a wireless signal, comprising the following steps: In step 521, extracting, clock frequency f2 from a wired data connection feeding a transmitter with data clocked at the clock frequency f2. In step 522, estimating clock frequency error between the clock frequency f2 and a clock frequency f1 derived from a local clock of the transmitter. In step 523, adding the clock frequency error to the clock frequency f1, resulting in a synthesized clock frequency f2. In step 524, modulating a data stream into a modulated signal. In step 525, up-converting, the modulated signal, using the synthesized clock frequency f2, into a wireless signal. In optional step 526, extracting, the synthesized clock frequency f2 by a receiver radio, and using it to clock a second wired data connection.

Figure 5D:
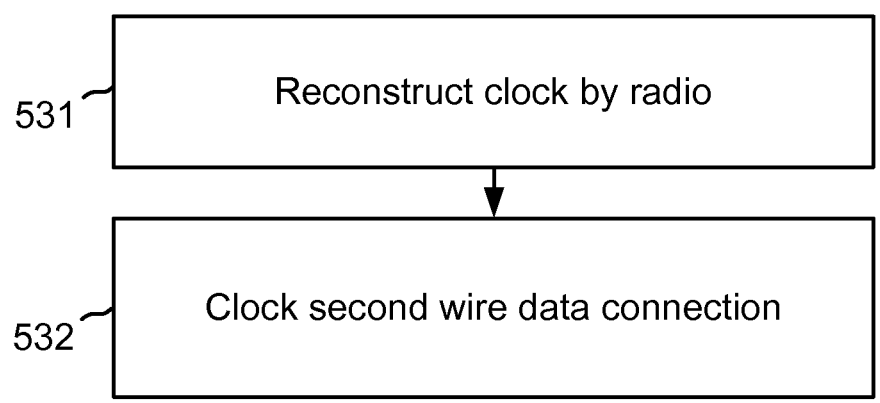
FIG. 5D is an illustration of a flow diagram describing one method for extracting a synthesized clock frequency and using it to clock a wired data connection.

FIG. 5D is a flow diagram illustrating one method of extracting the synthesized clock frequency f2 by a receiver radio and using the synthesized clock to clock a second wired data connection, comprising the following steps: In step 531, reconstructing, the synthesized clock frequency f2, by a radio of a receiver, into a reconstructed synthesized clock frequency f2, from the wireless signal. In step 532, clocking a second wired data connection, at the receiver, using the reconstructed synthesized clock frequency f2.

Figure 5E:
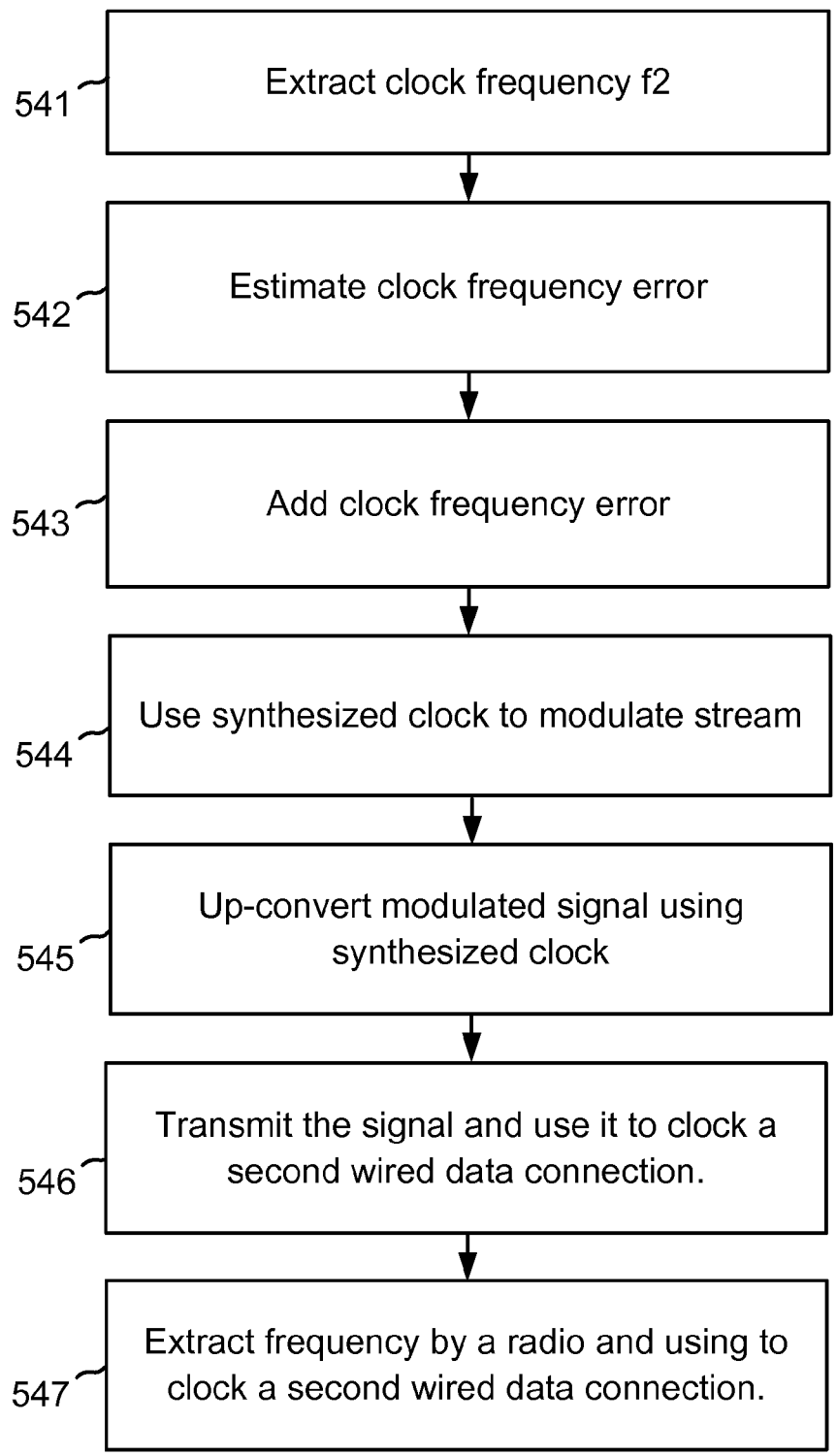
FIG. 5E is an illustration of a flow diagram describing one method for achieving clock synchronicity.

FIG. 5E is a flow diagram illustrating one method of using a synthesized clock frequency to generate a modulated signal and a wireless signal, comprising the following steps: In step 541, extracting, clock frequency f2, from a wired data connection feeding a transmitter with data clocked at the clock frequency f2. In step 542, estimating clock frequency error between the clock frequency f2 and a clock frequency f1 derived from a local clock of the transmitter. In step 543, adding the clock frequency error to the clock frequency f1, resulting in a synthesized clock frequency f2. In step 544, using the synthesized clock frequency f2 to modulate a data stream into a modulated signal. In step 545, up-converting, using the synthesized clock frequency f2, the modulated signal, into a wireless signal 132 containing synthesized clock frequency f2. In optional step 546, transmitting the signal modulated by synthesized clock frequency f2 and using it to clock a second wired data connection. In optional step 547, extracting, the synthesized clock frequency f2 by a receiver radio and using to clock a second wired data connection.

In one embodiment, a clock is distributed over a wireless link. A clock extractor extracts clock frequency f2, from a wired data connection feeding the transmitter with data clocked at the clock frequency f2. A clock error estimator estimates a first clock frequency error between the clock frequency f2 and a clock frequency f1 associated with a local clock of the transmitter. A transmitter sends the first clock frequency error, as a message to a receiver, over a wireless link. The transmitter uses a wireless transmitter interface, including a modulator and transmitter radio. The wireless transmitter interface is clocked at the clock frequency f1. The transmitter sends data to the receiver over the wireless link. A wireless receiver interface includes a de-modulator and receiver radio. The wireless receiver interface reconstructs clock frequency f1. A second clock error estimator estimates a second clock frequency error, between the reconstructed clock frequency f1 and a clock frequency f3 associated with a local clock of the receiver. The receiver calculates the first clock frequency error plus the second clock frequency error, resulting in a third clock frequency error, equal to the clock frequency f2 minus the clock frequency f3. A clock adder adds the clock frequency f3 to the third clock frequency error, resulting in a synthesized clock frequency f2. The receiver clocks a second wired data connection using the synthesized clock frequency f2.

Figure 6:
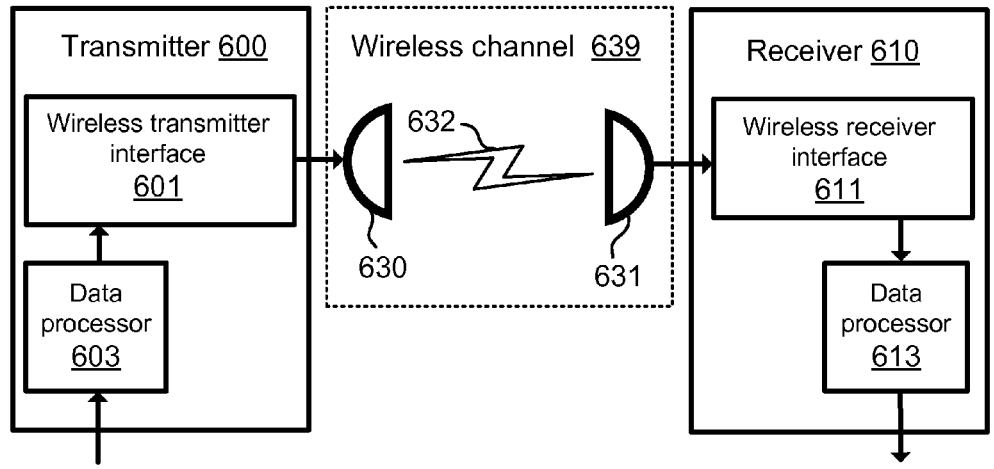
FIG. 6 illustrates one embodiment of a wireless network system including a transmitter and a receiver.

FIG. 6 illustrates one embodiment of a wireless radio system operative to transmit data from a first network to a second network over a wireless channel. A transmitter 600 sends the data to a receiver 610 via a wireless channel 639. The transmitter 600 includes a first data processor 603, and a wireless transmitter interface 601. The transmitter wireless transmission interface 601 includes at least a modulator and transmitter radio. Data from the first network arrives to the transmitter 600 via a first wired data connection. Data processor 603 converts the data into a data stream and sends the data stream to the wireless transmitter interface 601. The wireless transmitter interface 601 modulates and up-converts the data stream into a wireless signal 132, and sends it via wireless channel. 639. Wireless channel 639 includes a transmitter antenna 630, a receiver antenna 631, and a wireless signal 632.

The receiver 610 receives the wireless signal 632 via wireless channel 639. The receiver includes a wireless receiver interface 611 and a second data processor 613. The wireless receiver interface 611 includes a receiver radio and a demodulator. The wireless receiver interface 611 down-converts and demodulates the wireless signal 632 into a received data stream. The network interface 613 then sends the data into the second network via a second wired data connection. In one embodiment, clock frequency or clock frequency error is sent as part of the data stream and is used by the receiver 601 to clock data at the second wired data connection.

Figure 6A:
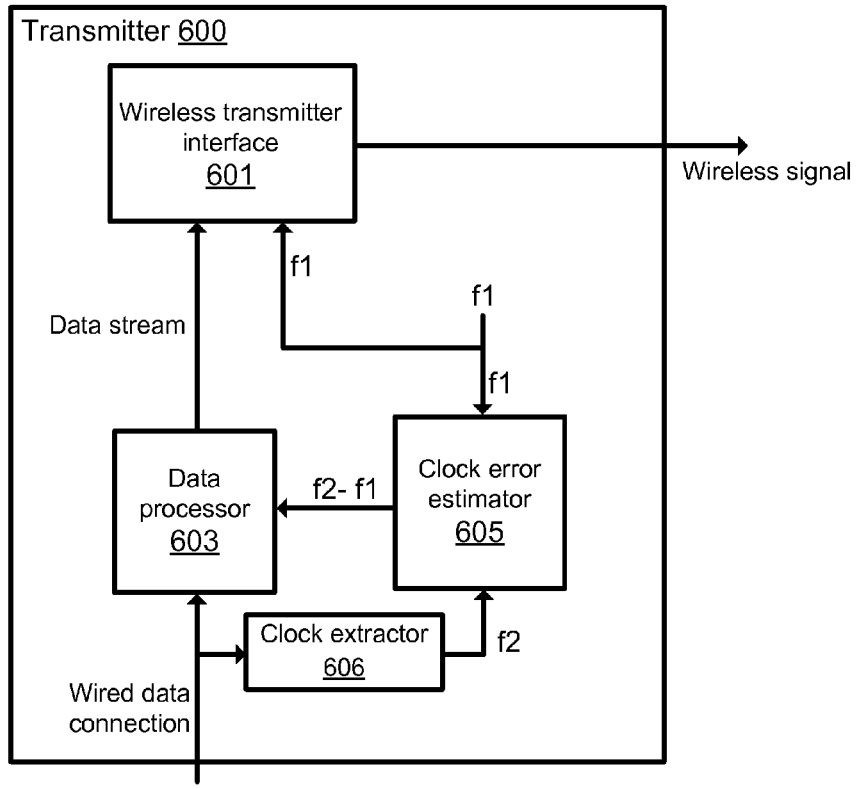
FIG. 6A illustrates one embodiment of a wireless transmitter including a wireless transmitter interface.

FIG. 6A illustrated one embodiment of a transmitter 600 distributing clock over wireless link. Clock extractor 606 extracts clock frequency f2, from a wired data connection feeding the transmitter 600 with data clocked at the clock frequency f2. Clock error estimator 605 estimates a first clock frequency error, between the clock frequency f2 and a clock frequency f1 associated with a local clock of the transmitter and scaled to the same assumed frequency. The first clock frequency error is a numeric value. In one embodiment, the first clock frequency error is represented in PPM or in Hz. Clock error estimator 605 sends the first clock frequency error to the data processor 604, which embeds it into the data stream as a message, and then sends the data stream to the wireless transmitter interface 601. The wireless transmitter interface 601 is clocked at the clock frequency f1, and sends data from the transmitter to the receiver over the wireless link 632.

According to one example, the wired data connection is clocked at 125 MHz+10 PPM. Clock frequency f2 is 125 MHz+10 PPM. Assumed frequency f2 is 125 MHz, clock inaccuracy f2 is 10 PPM. Clock frequency f1 is 10 MHz+1 PPM, assumed frequency f1 is 10 MHz and clock inaccuracy f1 is +1 PPM. Clock frequency f1 is scaled to assumed frequency 125 MHz by up-scaling the frequency of clock frequency f1 by a factor of 25 to 250 MHz, and down-scaling the frequency of clock frequency f1 by a factor of 2 to 125 MHz. The first clock frequency error (illustrated as "f2−f1") is equal to the clock inaccuracy f2 minus clock inaccuracy f1, and is 9 PPM, or 1125 Hz relative to assumed clock frequency 125 MHz.

Figure 6B:
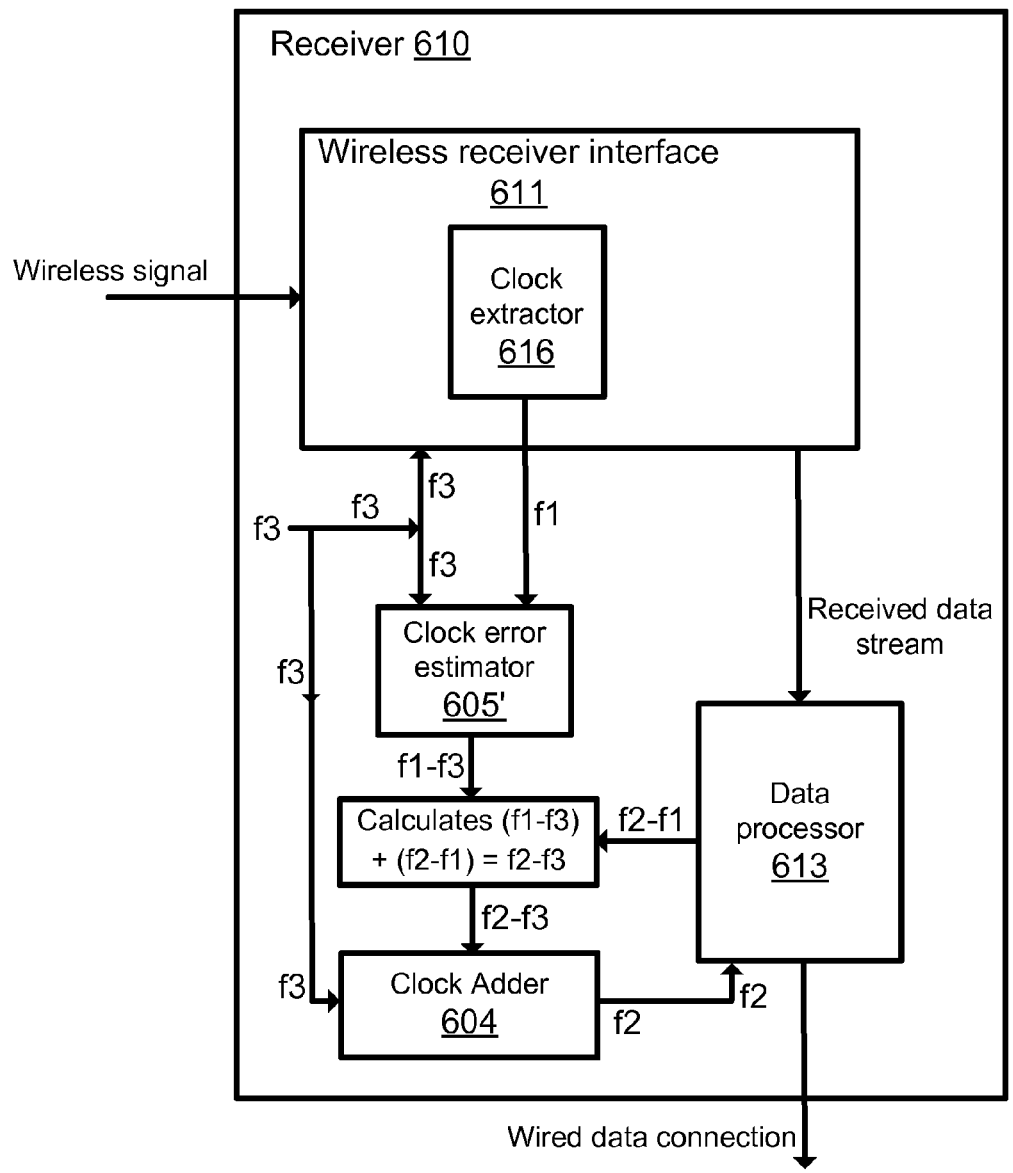
FIG. 6B illustrates one embodiment of a wireless receiver including a wireless receiver interface.

FIG. 6B illustrates one embodiment of a receiver 610 associated with distributing clock over wireless link. A receiver 610 includes a wireless receiver interface 611, a second clock error estimator 605', a second data processor 613, and clock adder 604. The wireless receiver interface 611 includes a de-modulator and receiver radio as well as a second clock extractor 616. Wireless receiver interface 611 down converts and demodulates the wireless signal, and sends a received data stream to data processor 613. Second clock extractor 616 reconstructs clock frequency f1 as a reconstructed clock frequency f1. According to one example, reconstructed clock frequency f1 is a square wave with a frequency f1. Second data processor 613 extracts the first clock error (a numeric value illustrated as "f2−f1") from the received data stream.

Second clock error estimator 605' estimates a second clock frequency error (illustrated as "f1−f3") between the reconstructed clock frequency f1, and a clock frequency f3 associated with a local clock of the receiver. The second clock frequency error ("f1−f3") is a numeric value. The frequency of clock frequency f3 is equal to assumed frequency f3 plus clock inaccuracy f3. The second frequency error (illustrated as "f1−f3") is equal to the difference between clock inaccuracy f1 and clock inaccuracy f3. The receiver 610 arithmetically calculates the first clock frequency error (illustrated as "f2−f1") plus the second clock frequency error (illustrated as "f1−f3"), resulting in a third clock frequency error, a numeric value equal to the clock frequency f2 minus the clock frequency f3 (illustrated as "f2−f3"), and equal to the clock inaccuracy f2 minus clock inaccuracy f3. Clock adder 604 adds the clock frequency f3 to the third frequency error (illustrated as "f2−f3"), resulting in a synthesized clock frequency f2. In one example synthesized clock frequency f2 is a square wave with frequency f2. The receiver 611 clocks data transmitted from the second data processor 613 to a second wired data connection at the receiver, using the synthesized clock frequency f2.

According to one example, "f2−f1" is 9 PPM. Clock frequency f3 is 10 MHz+5 PPM, assumed frequency f3 is 10 MHz, and clock inaccuracy f3 is +5 PPM. The first clock frequency error ("f2−f1") is 9 PPM, and the second clock frequency error ("f1−f3") is −4 PPM (minus four PPM). Adding the first clock frequency error (9 PPM) to the second clock frequency error (−4 PPM) results in a third clock frequency error of +5 PPM. Adding the third clock frequency error (+5 PPM), to clock frequency f3 (10 MHz+5 PPM), results in a synthesized clock frequency f2 of 10 MHz+10 PPM. The clock inaccuracy of synthesized clock frequency f2 (+10 PPM) is substantially equal to the clock inaccuracy f2. The data on the second wired data connection is clocked at a frequency with substantially the same clock inaccuracy as the clock used to clock data on the first wired data connection.

The synthesized clock frequency f2 may be scaled-up to assumed clock frequency f2 of 125 MHz (by up-scaling 12.5 times higher) resulting in a synthesized clock frequency f2 of 125 MHz+10 PPM, substantially equal in frequency to clock frequency f2.

Optionally, the wired data connection feeding the transmitter and the second wired data connection at the receiver are both Ethernet wired connections. Optionally, the second wired data connection is used to output data received by the de-modulator from the transmitter. Optionally, clock adder 604 adds the clock frequency f3 to the third clock frequency error using Direct Digital Synthesis (DDS). Optionally, the DDS is a discrete component in the receiver.

Optionally, clock adder 604 adds the clock frequency f3 to the third frequency numerically and is implemented by a processor. Optionally, the processor is the same processor used to for de-modulation. Optionally, clock adder 604 adds the clock frequency f3 to the third clock frequency error using Direct Digital Synthesis (DDS).

Optionally, wireless transmitter interface 601 is clocked at the clock frequency f1, by using the modulator with data symbols or spreading chips of duration associated with the clock frequency f1. Optionally, the modulator uses a modulation selected from a group of OFDM, Single Carrier QAM, and CDMA.

Optionally, second clock error estimator 605' estimates the clock frequency error between the reconstructed clock frequency f1 and the clock frequency f3, by counting clock cycles of the reconstructed clock frequency f1 and the clock frequency f3 over a period, and comparing the counts. Optionally, clock error estimator 605 estimates the clock frequency error between the clock frequency f2 and the clock frequency f1, by counting clock cycles of the clock frequency f2 and the clock frequency f1 over a period, and comparing the counts.

In one embodiment, a clock is distributed over a wireless link. A clock extractor extracts clock frequency f2, from a wired data connection feeding the transmitter with data clocked at the clock frequency f2. A clock error estimator estimates a first clock frequency error between the clock frequency f2 and a clock frequency f1 associated with a local clock of the transmitter. A transmitter sends the first clock frequency error, as a message to a receiver, over a wireless link. The transmitter uses a wireless transmitter interface, including a modulator and transmitter radio. The wireless transmitter interface is clocked at the clock frequency f1. The transmitter sends data to the receiver over the wireless link. A wireless receiver interface includes a de-modulator and receiver radio. The wireless receiver interface reconstructs clock frequency f1. A clock adder adds the reconstructing clock frequency f1 to the first clock frequency error, resulting in a synthesized clock frequency f2. The receiver clocks a second wired data connection at the receiver, using the synthesized clock frequency f2.

Figure 6C:
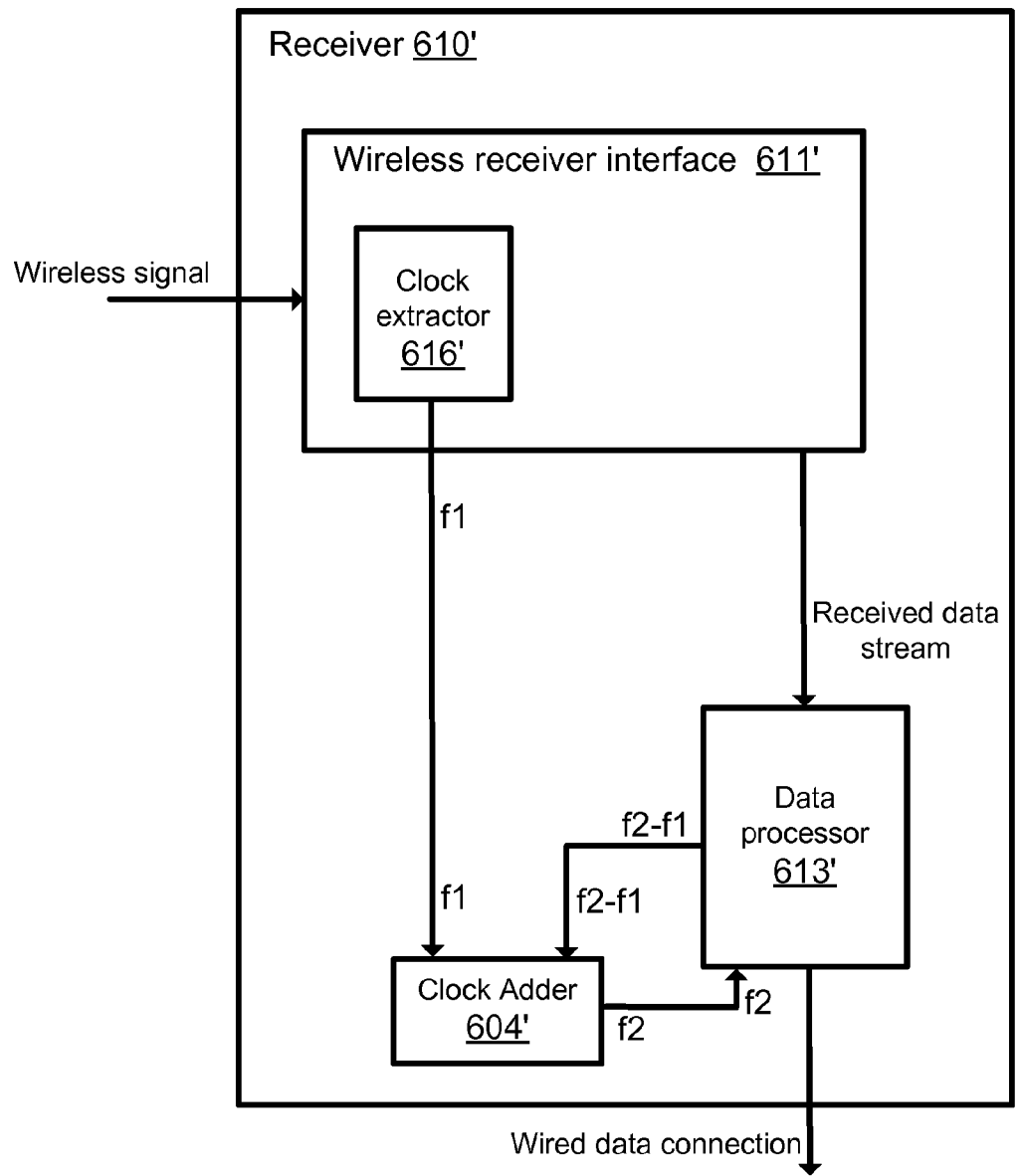
FIG. 6C illustrates one embodiment of a wireless receiver including a wireless receiver interface.

FIG. 6C illustrates one embodiment of a receiver 610', associated with distributing clock over wireless. A receiver 610' includes a wireless receiver interface 611', a second data processor 613' and a clock adder 604. The wireless receiver interface 611' includes a de-modulator and receiver radio as well as a second clock extractor 616'.

The wireless receiver interface 611' reconstructs clock frequency f1 as a reconstructed clock frequency f1. In one example, reconstructed clock frequency f1 is a square wave with a frequency f1. Data processor 613 extracts the first clock error (a numeric value illustrated as "f2−f1") from the received data stream. Clock adder 604' adds the reconstructing clock frequency f1 to the first clock frequency error (illustrated as "f2−f1"), resulting in a synthesized clock frequency f2. The receiver 610' clocks data transmitted from the second data processor 613 to a second wired data connection at the receiver, using the synthesized clock frequency f2. Optionally, the wired data connection feeding the transmitter and the second wired data connection at the receiver are both Ethernet wired connections. Optionally, the second wired data connection is used to output data received by the de-modulator from the transmitter.

Optionally, clock adder 604' adds the reconstructing clock frequency f1 to the first frequency error using Direct Digital Synthesis (DDS). Optionally, clock adder 604' is a discrete DDS component in the receiver.

Optionally, clock adder 604' adds the reconstructed clock frequency f1 to the first frequency error numerically, and is a part of a processor. Optionally, the processor is the same processor used to for de-modulation. Optionally, the processor adds reconstructed clock frequency f1 to the first frequency error using Direct Digital Synthesis (DDS).

Figure 7A:
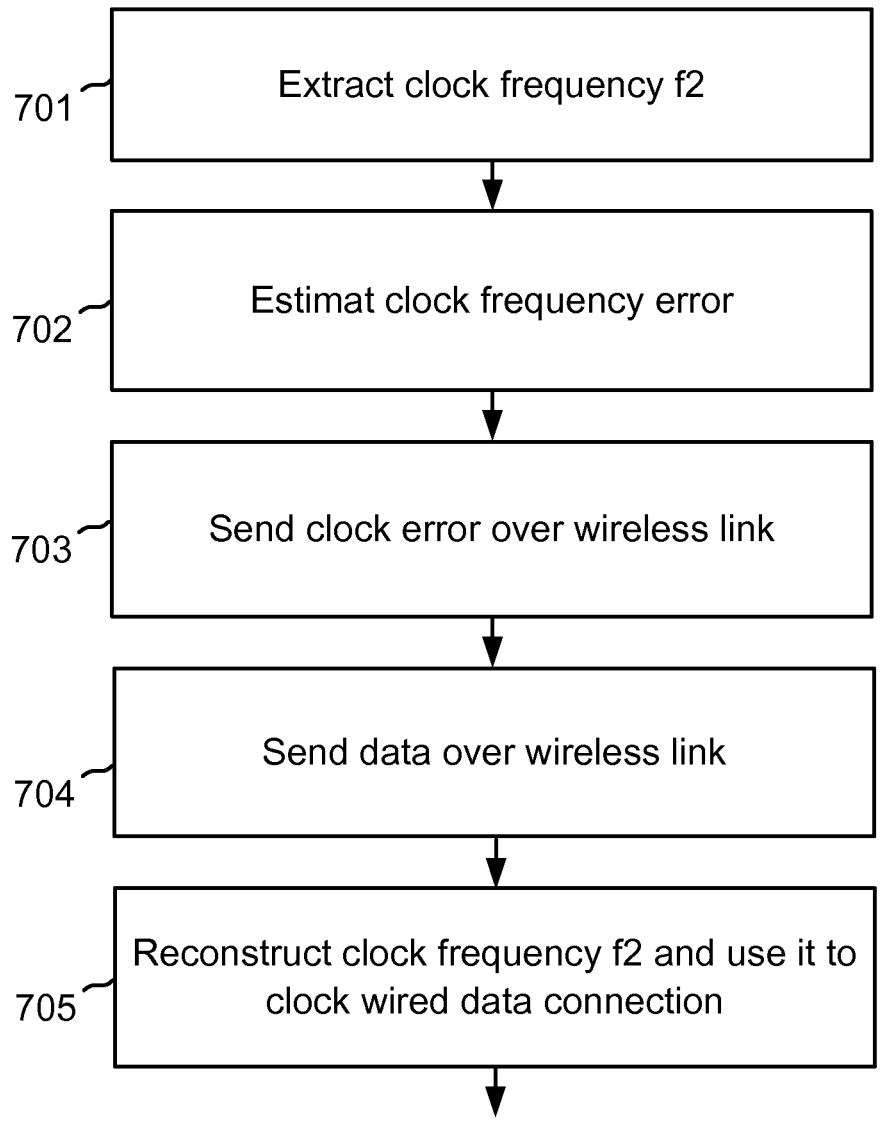
FIG. 7A is an illustration of a flow diagram describing one method for achieving clock synchronicity.

FIG. 7A is a flow diagram illustrating one method of distributing clock over wireless link, comprising the following steps: In step 701, extracting, clock frequency f2 from a wired data connection feeding the transmitter with data clocked at the clock frequency f2. In step 702, estimating a first clock frequency error between the clock frequency f2 and a clock frequency f1 associated with a local clock of the transmitter. In step 703, sending the first clock frequency error, as a message to a receiver, by the transmitter, over a wireless link. In step 704, using a wireless transmitter interface including a modulator and transmitter radio, the wireless transmitter interface clocked at the clock frequency f1 to send data from the transmitter to the receiver over the wireless link. In step 705, reconstructing clock frequency f2, at the receiver and using it to clock a wired data connection.

Figure 7B:
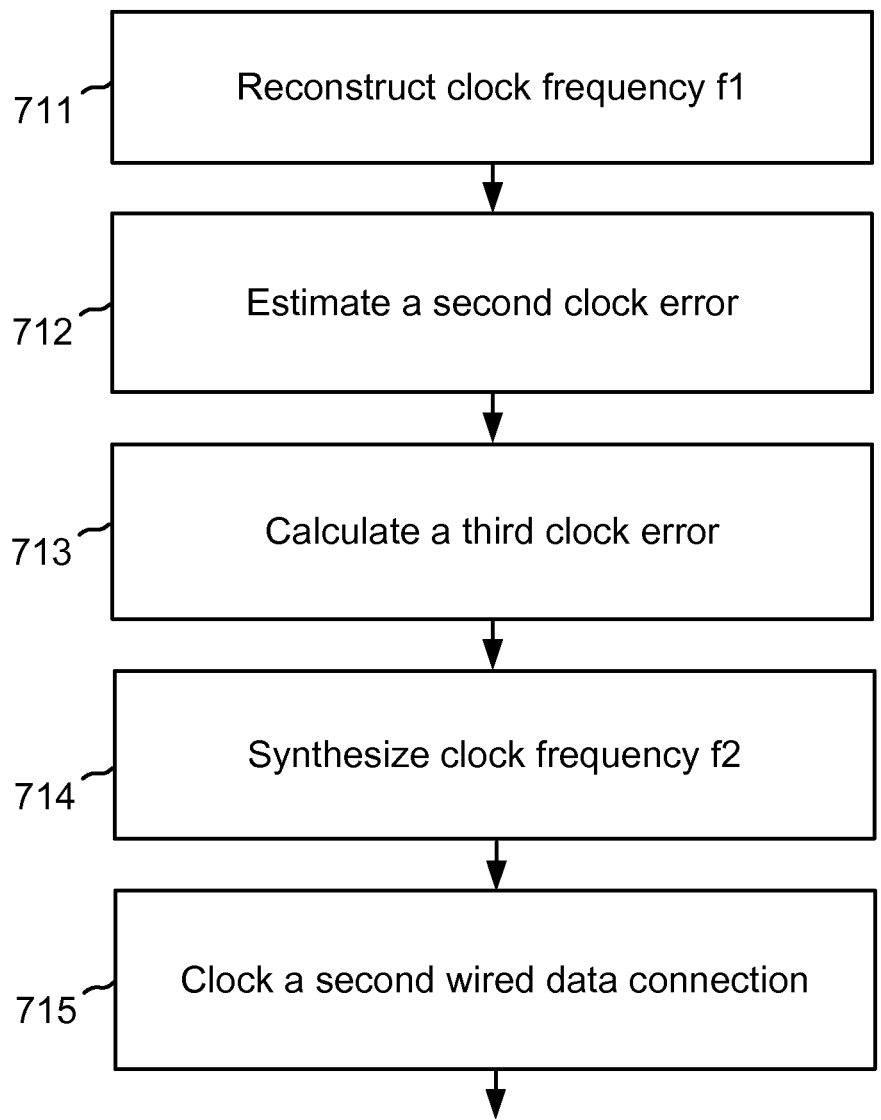
FIG. 7B is an illustration of a flow diagram describing one method for reconstructing a clock signal and using it to clock a wired data connection.

FIG. 7B illustrates one method of reconstructing clock frequency f2 at the receiver, and using it to clock a wired data connection, comprising the following steps: In step 711, reconstructing clock frequency f1 by a wireless receiver interface including a de-modulator and receiver radio as a reconstructed clock frequency f1. In step 712, estimating a second clock frequency error between the reconstructed clock frequency f1 and a clock frequency f3 associated with a local clock of the receiver. In step 713, calculating, by the receiver, the first clock frequency error plus the second clock frequency error, resulting in a third clock frequency error equal to the clock frequency f2 minus the clock frequency f3. In step 714, adding the clock frequency f3 to the third clock frequency error, by the receiver, resulting in a synthesized clock frequency f2. In step 715, clocking a second wired data connection at the receiver, using the synthesized clock frequency f2.

Figure 7C:
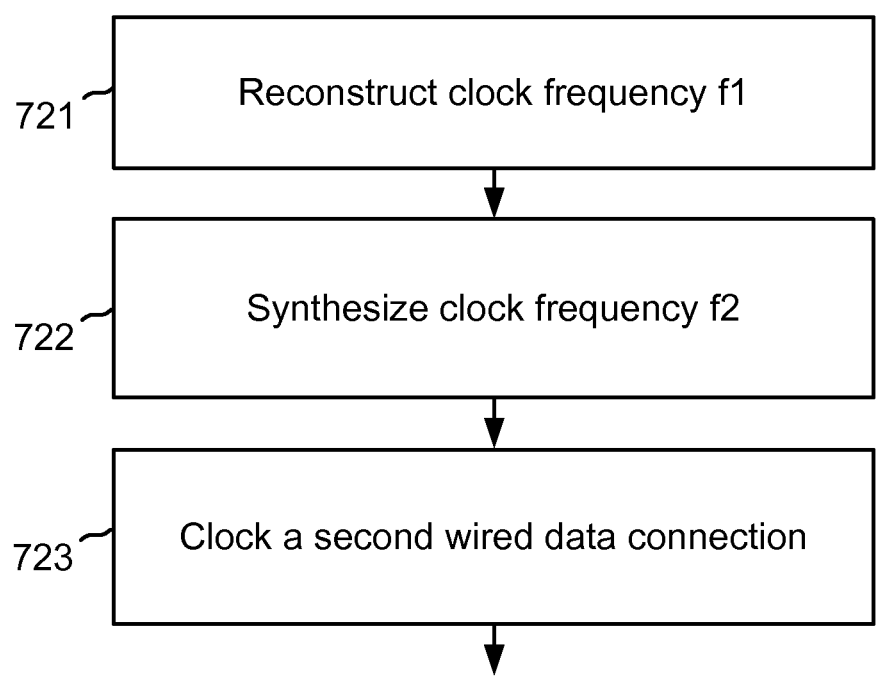
FIG. 7C is an illustration of a flow diagram describing one method for reconstructing a clock signal and using it to clock a wired data connection.

FIG. 7C illustrates one method of reconstructing clock frequency f2 at the receiver, and using it to clock a wired data connection, comprising the following steps: In step 721, reconstructing clock frequency f1 by a wireless receiver interface including a de-modulator and receiver radio as a reconstructed clock frequency f1. In step 722, adding the reconstructing clock frequency f1 to the first clock frequency error, by the receiver, resulting in a synthesized clock frequency f2. In step 723, clocking a second wired data connection at the receiver, using the synthesized clock frequency f2.

In this description, numerous specific details are set forth. However, the embodiments of the invention may be practiced without some of these specific details. In other instances, well-known hardware, software, materials, structures, and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications and variations will be apparent to those skilled in the art. It is to be understood that other embodiments may be utilized and structural changes may be made without departing from the scope of the embodiments. Accordingly, it is intended to embrace all such alternatives, modifications and variations that fall within the spirit and scope of the appended claims and their equivalents.

What is claimed is:

1. A method for using a synthesized clock frequency to generate a modulated signal, comprising:
   extracting, by a transmitter, clock frequency f2 from a wired data connection feeding the transmitter with data clocked at the clock frequency f2;
   estimating clock frequency error between the clock frequency f2 and a clock frequency f1 derived from a local clock of the transmitter;
   adding the clock frequency error to the clock frequency f1, resulting in a synthesized clock frequency f2;
   using the synthesized clock frequency f2 to modulate a data stream into a modulated signal;
   reconstructing, by a radio of a receiver, the synthesized clock frequency f2 into reconstructed synthesized clock frequency f2; and
   clocking a second wired data connection, at the receiver, using the reconstructed synthesized clock frequency f2.

2. The method of claim 1, wherein adding the clock frequency error to the clock frequency f1 is done using Direct Digital Synthesis (DDS).

3. The method of claim 2, wherein the DDS is a discrete component in the transmitter.

4. The method of claim 1, wherein adding the clock frequency error to the clock frequency f1 is done numerically by a processor.

5. The method of claim 4, wherein the processor is also used to modulate the data.

6. The method of claim 4, wherein adding the clock frequency error to the clock frequency f1 is done using Direct Digital Synthesis (DDS).

7. The method of claim 1, wherein the modulated signal is OFDM, and using the synthesized clock frequency f2 to modulate the data comprises clocking an Inverse Fast Fourier Transform (IFFT) using a clock associated with the synthesized clock frequency f2.

8. The method of claim 1, wherein estimating the clock frequency error between the clock frequency f2 and the clock frequency f1 is done by counting clock cycles of the clock frequency f2 and the clock frequency f1 over a period, and comparing the counts.

9. The method of claim 1, further comprising the step of up-converting the modulated signal into a wireless signal containing the synthesized clock frequency f2.

10. The method of claim 1, wherein the wired data connection feeding the transmitter is an Ethernet wired connection.

11. A method for using a synthesized clock frequency to generate a wireless signal, comprising:
    extracting, by a transmitter, clock frequency f2 from a wired data connection feeding the transmitter with data clocked at the clock frequency f2;
    estimating clock frequency error between the clock frequency f2 and a clock frequency f1 derived from a local clock of the transmitter;
    adding the clock frequency error to the clock frequency f1, resulting in a synthesized clock frequency f2;

modulating a data stream into a modulated signal;

up-converting, using the synthesized clock frequency f2, the modulated signal into a wireless signal;

reconstructing, by a radio of a receiver, from the wireless signal, the synthesized clock frequency f2 into reconstructed synthesized clock frequency f2; and clocking a second wired data connection, at the receiver, using the reconstructed synthesized clock frequency f2.

12. The method of claim 11, wherein adding the clock frequency error to the clock frequency f1 is done using Direct Digital Synthesis (DDS).

13. The method of claim 12, wherein the DDS is a discrete component in the transmitter.

14. The method of claim 11, wherein adding the clock frequency error to the clock frequency f1 is done numerically by a processor.

15. The method of claim 11, wherein estimating the clock frequency error between the clock frequency f2 and the clock frequency f1 is done by counting clock cycles of the clock frequency f2 and the clock frequency f1 over a period, and comparing the counts.

16. The method of claim 11, wherein the extraction is done using a Phase Lock Loop (PLL).

17. A method for using a synthesized clock frequency to generate a modulated signal and up-convert it to a wireless signal, comprising:

extracting, by a transmitter, clock frequency f2 from a wired data connection feeding the transmitter with data clocked at the clock frequency f2;

estimating clock frequency error between the clock frequency f2 and a clock frequency f1 derived from a local clock of the transmitter;

adding the clock frequency error to the clock frequency f1, resulting in a synthesized clock frequency f2;

using the synthesized clock frequency f2 to modulate a data stream into a modulated signal containing the synthesized clock frequency f2;

up-converting, using the synthesized clock frequency f2, the modulated signal into a wireless signal containing synthesized clock frequency f2;

reconstructing, by a radio of a receiver, from the wireless signal, the synthesized clock frequency f2 into reconstructed synthesized clock frequency f2; and clocking a second wired data connection, at the receiver, using the reconstructed synthesized clock frequency f2.

18. The method of claim 17, wherein the wired data connection feeding the transmitter is an Ethernet wired connection.

* * * * *